United States Patent
Kundu et al.

(10) Patent No.: US 11,855,881 B2
(45) Date of Patent: Dec. 26, 2023

(54) SYSTEM AND METHOD FOR FACILITATING EFFICIENT PACKET FORWARDING USING A MESSAGE STATE TABLE IN A NETWORK INTERFACE CONTROLLER (NIC)

(71) Applicant: Hewlett Packard Enterprise Development LP, Houston, TX (US)

(72) Inventors: Partha Pratim Kundu, Palo Alto, CA (US); Robert Alverson, Seattle, WA (US); Duncan Roweth, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 127 days.

(21) Appl. No.: 17/594,533

(22) PCT Filed: Mar. 23, 2020

(86) PCT No.: PCT/US2020/024241
§ 371 (c)(1),
(2) Date: Oct. 21, 2021

(87) PCT Pub. No.: WO2020/236268
PCT Pub. Date: Nov. 26, 2020

(65) Prior Publication Data
US 2022/0231965 A1 Jul. 21, 2022

Related U.S. Application Data

(60) Provisional application No. 62/852,273, filed on May 23, 2019, provisional application No. 62/852,289, (Continued)

(51) Int. Cl.
*H04L 45/02* (2022.01)
*H04L 45/028* (2022.01)
(Continued)

(52) U.S. Cl.
CPC .............. *H04L 45/02* (2013.01); *G06F 9/505* (2013.01); *G06F 9/546* (2013.01);
(Continued)

(58) Field of Classification Search
CPC . H04L 45/7453; H04L 45/021; H04L 47/323; H04L 45/24; H04L 47/52;
(Continued)

(56) References Cited

U.S. PATENT DOCUMENTS 4,807,118 A    2/1989   Lin et al.
5,138,615 A    8/1992   Lamport et al.
(Continued)

FOREIGN PATENT DOCUMENTS

CN   101729609 A    6/2010
CN   102932203 A    2/2013
(Continued)

OTHER PUBLICATIONS

International Search Report and Written Opinion received for PCT Patent Application No. PCT/US20/24340, dated Oct. 26, 2020, 9 pages.
(Continued)

*Primary Examiner* — Oussama Roudani
(74) *Attorney, Agent, or Firm* — Yao Legal Services, Inc.

(57) ABSTRACT

One embodiment provides a network interface controller (NIC). The NIC can include a storage device, a network interface, a hardware list-processing engine (LPE), and a message state table (MST) logic block. The storage device can store an MST. The network interface can couple the NIC to a network. The LPE can perform message matching on a first packet of a message received via the network interface. The MST logic block can store results of the message matching in the MST and receive a request to read the results
(Continued)

of the message matching from the MST if the NIC receives a second packet associated with the message.

20 Claims, 7 Drawing Sheets

Related U.S. Application Data filed on May 23, 2019, provisional application No. 62/852,203, filed on May 23, 2019.

(51) Int. Cl.

| | | |
|---|---|---|
| *H04L 45/125* | (2022.01) | |
| *H04L 45/00* | (2022.01) | |
| *H04L 45/122* | (2022.01) | |
| *H04L 47/76* | (2022.01) | |
| *H04L 49/15* | (2022.01) | |
| *H04L 49/00* | (2022.01) | |
| *H04L 69/40* | (2022.01) | |
| *H04L 47/10* | (2022.01) | |
| *H04L 49/9005* | (2022.01) | |
| *H04L 47/34* | (2022.01) | |
| *H04L 67/1097* | (2022.01) | |
| *G06F 13/16* | (2006.01) | |
| *H04L 45/021* | (2022.01) | |
| *H04L 47/12* | (2022.01) | |
| *G06F 13/42* | (2006.01) | |
| *H04L 47/2441* | (2022.01) | |
| *H04L 47/30* | (2022.01) | |
| *H04L 47/62* | (2022.01) | |
| *H04L 47/24* | (2022.01) | |
| *H04L 49/90* | (2022.01) | |
| *G06F 13/38* | (2006.01) | |
| *G06F 13/40* | (2006.01) | |
| *H04L 45/745* | (2022.01) | |
| *H04L 47/2483* | (2022.01) | |
| *H04L 47/629* | (2022.01) | |
| *H04L 47/80* | (2022.01) | |
| *H04L 49/101* | (2022.01) | |
| *H04L 45/12* | (2022.01) | |
| *H04L 47/122* | (2022.01) | |
| *G06F 12/1036* | (2016.01) | |
| *G06F 15/173* | (2006.01) | |
| *H04L 43/10* | (2022.01) | |
| *H04L 45/42* | (2022.01) | |
| *H04L 47/11* | (2022.01) | |
| *G06F 12/0862* | (2016.01) | |
| *G06F 12/1045* | (2016.01) | |
| *H04L 47/32* | (2022.01) | |
| *G06F 9/54* | (2006.01) | |
| *G06F 13/14* | (2006.01) | |
| *G06F 9/50* | (2006.01) | |
| *H04L 47/22* | (2022.01) | |
| *H04L 47/52* | (2022.01) | |
| *H04L 47/6275* | (2022.01) | |
| *H04L 45/24* | (2022.01) | |
| *H04L 45/7453* | (2022.01) | |
| *H04L 45/16* | (2022.01) | |
| *H04L 69/22* | (2022.01) | |
| *H04L 47/762* | (2022.01) | |
| *H04L 47/78* | (2022.01) | |
| *H04L 47/20* | (2022.01) | |
| *H04L 49/9047* | (2022.01) | |
| *H04L 1/00* | (2006.01) | |
| *H04L 43/0876* | (2022.01) | |
| *H04L 47/2466* | (2022.01) | |
| *H04L 47/625* | (2022.01) | |
| *H04L 69/28* | (2022.01) | |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/626* (2013.01); *H04L 47/629* (2013.01); *H04L 47/6235* (2013.01); *H04L 47/6275* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(58) Field of Classification Search
CPC ..... H04L 45/42; H04L 45/20; H04L 49/9021; H04L 69/40; H04L 47/12; H04L 47/18; H04L 1/0083; H04L 45/745; H04L 47/24; H04L 47/621; H04L 49/90; H04L 45/125; G06F 13/4022; G06F 13/4265
See application file for complete search history.

(56) References Cited

U.S. PATENT DOCUMENTS

| | | |
|---|---|---|
| 5,457,687 A | 10/1995 | Newman |
| 5,937,436 A | 8/1999 | Watkins |
| 5,960,178 A | 9/1999 | Cochinwala et al. |
| 5,970,232 A | 10/1999 | Passint et al. |
| 5,983,332 A | 11/1999 | Watkins |
| 6,112,265 A | 8/2000 | Harriman et al. |
| 6,230,252 B1 | 5/2001 | Passint et al. |

(56) References Cited

U.S. PATENT DOCUMENTS

| | | |
|---|---|---|
| 6,246,682 B1 | 6/2001 | Roy et al. |
| 6,493,347 B2 | 12/2002 | Sindhu et al. |
| 6,545,981 B1 | 4/2003 | Garcia et al. |
| 6,633,580 B1 | 10/2003 | Toerudbakken et al. |
| 6,674,720 B1 | 1/2004 | Passint et al. |
| 6,714,553 B1 | 3/2004 | Poole et al. |
| 6,728,211 B1 | 4/2004 | Peris et al. |
| 6,732,212 B2 | 5/2004 | Sugahara et al. |
| 6,735,173 B1 | 5/2004 | Lenoski et al. |
| 6,894,974 B1 | 5/2005 | Aweya et al. |
| 7,023,856 B1 | 4/2006 | Washabaugh et al. |
| 7,133,940 B2 | 11/2006 | Blightman et al. |
| 7,218,637 B1 | 5/2007 | Best et al. |
| 7,269,180 B2 | 9/2007 | Bly et al. |
| 7,305,487 B2 | 12/2007 | Blumrich et al. |
| 7,337,285 B2 | 2/2008 | Tanoue |
| 7,397,797 B2 | 7/2008 | Alfieri et al. |
| 7,430,559 B2 | 9/2008 | Lomet |
| 7,441,006 B2 | 10/2008 | Biran et al. |
| 7,464,174 B1 | 12/2008 | Ngai |
| 7,483,442 B1 | 1/2009 | Torudbakken et al. |
| 7,562,366 B2 | 7/2009 | Pope et al. |
| 7,593,329 B2 | 9/2009 | Kwan et al. |
| 7,596,628 B2 | 9/2009 | Aloni et al. |
| 7,620,791 B1 | 11/2009 | Wentzlaff et al. |
| 7,633,869 B1 | 12/2009 | Morris et al. |
| 7,639,616 B1 | 12/2009 | Manula et al. |
| 7,734,894 B1 | 6/2010 | Wentzlaff et al. |
| 7,774,461 B2 | 8/2010 | Tanaka et al. |
| 7,782,869 B1 | 8/2010 | Chitlur Srinivasa |
| 7,796,579 B2 | 9/2010 | Bruss |
| 7,856,026 B1 | 12/2010 | Finan et al. |
| 7,933,282 B1 | 4/2011 | Gupta et al. |
| 7,953,002 B2 | 5/2011 | Opsasnick |
| 7,975,120 B2 | 7/2011 | Sabbatini, Jr. et al. |
| 8,014,278 B1 | 9/2011 | Subramanian et al. |
| 8,023,521 B2 | 9/2011 | Woo et al. |
| 8,050,180 B2 | 11/2011 | Judd |
| 8,077,606 B1 | 12/2011 | Mark |
| 8,103,788 B1 | 1/2012 | Miranda |
| 8,160,085 B2 | 4/2012 | Voruganti et al. |
| 8,175,107 B1 | 5/2012 | Yalagandula et al. |
| 8,249,072 B2 | 8/2012 | Sugumar et al. |
| 8,281,013 B2 | 10/2012 | Mundkur et al. |
| 8,352,727 B2 | 1/2013 | Chen et al. |
| 8,353,003 B2 | 1/2013 | Noehring et al. |
| 8,443,151 B2 | 5/2013 | Tang et al. |
| 8,473,783 B2 | 6/2013 | Andrade et al. |
| 8,543,534 B2 | 9/2013 | Alves et al. |
| 8,619,793 B2 | 12/2013 | Lavian et al. |
| 8,626,957 B2 | 1/2014 | Blumrich et al. |
| 8,650,582 B2 | 2/2014 | Archer et al. |
| 8,706,832 B2 | 4/2014 | Blocksome |
| 8,719,543 B2 | 5/2014 | Kaminski et al. |
| 8,811,183 B1 | 8/2014 | Anand et al. |
| 8,948,175 B2 | 2/2015 | Bly et al. |
| 8,971,345 B1 | 3/2015 | McCanne et al. |
| 9,001,663 B2 | 4/2015 | Attar et al. |
| 9,053,012 B1 | 6/2015 | Northcott et al. |
| 9,088,496 B2 | 7/2015 | Vaidya et al. |
| 9,094,327 B2 | 7/2015 | Jacobs et al. |
| 9,178,782 B2 | 11/2015 | Matthews et al. |
| 9,208,071 B2 | 12/2015 | Talagala et al. |
| 9,218,278 B2 | 12/2015 | Talagala et al. |
| 9,231,876 B2 | 1/2016 | Mir et al. |
| 9,231,888 B2 | 1/2016 | Bogdanski et al. |
| 9,239,804 B2 | 1/2016 | Kegel et al. |
| 9,269,438 B2 | 2/2016 | Nachimuthu et al. |
| 9,276,864 B1 | 3/2016 | Pradeep |
| 9,436,651 B2 | 9/2016 | Underwood et al. |
| 9,455,915 B2 | 9/2016 | Sinha et al. |
| 9,460,178 B2 | 10/2016 | Bashyam et al. |
| 9,479,426 B2 | 10/2016 | Munger et al. |
| 9,496,991 B2 | 11/2016 | Plamondon et al. |
| 9,544,234 B1 | 1/2017 | Markine |
| 9,548,924 B2 | 1/2017 | Pettit et al. |
| 9,594,521 B2 | 3/2017 | Blagodurov et al. |
| 9,635,121 B2 | 4/2017 | Mathew et al. |
| 9,742,855 B2 | 8/2017 | Shuler et al. |
| 9,762,488 B2 | 9/2017 | Previdi et al. |
| 9,762,497 B2 | 9/2017 | Kishore et al. |
| 9,830,273 B2 | 11/2017 | Bk et al. |
| 9,838,500 B1 | 12/2017 | Ilan et al. |
| 9,853,900 B1 | 12/2017 | Mula et al. |
| 9,887,923 B2 | 2/2018 | Chorafakis et al. |
| 10,003,544 B2 | 6/2018 | Liu et al. |
| 10,009,270 B1 | 6/2018 | Stark et al. |
| 10,031,857 B2 | 7/2018 | Menachem et al. |
| 10,050,896 B2 | 8/2018 | Yang et al. |
| 10,061,613 B1 | 8/2018 | Brooker et al. |
| 10,063,481 B1 | 8/2018 | Jiang et al. |
| 10,089,220 B1 | 10/2018 | McKelvie et al. |
| 10,169,060 B1 | 1/2019 | Mncent et al. |
| 10,178,035 B2 | 1/2019 | Dillon |
| 10,200,279 B1 | 2/2019 | Aljaedi |
| 10,218,634 B2 | 2/2019 | Aldebert et al. |
| 10,270,700 B2 | 4/2019 | Burnette et al. |
| 10,305,772 B2 | 5/2019 | Zur et al. |
| 10,331,590 B2 | 6/2019 | Macnamara et al. |
| 10,353,833 B2 | 7/2019 | Hagspiel et al. |
| 10,454,835 B2 | 10/2019 | Contavalli et al. |
| 10,498,672 B2 | 12/2019 | Graham et al. |
| 10,567,307 B2 | 2/2020 | Fairhurst et al. |
| 10,728,173 B1 | 7/2020 | Agrawal et al. |
| 10,802,828 B1 | 10/2020 | Volpe et al. |
| 10,817,502 B2 | 10/2020 | Talagala et al. |
| 11,128,561 B1 | 9/2021 | Matthews et al. |
| 11,271,869 B1 | 3/2022 | Agrawal et al. |
| 11,416,749 B2 | 8/2022 | Bshara et al. |
| 11,444,886 B1 | 9/2022 | Stawitzky et al. |
| 2001/0010692 A1 | 8/2001 | Sindhu et al. |
| 2001/0047438 A1 | 11/2001 | Forin |
| 2002/0174279 A1 | 11/2002 | Wynne et al. |
| 2003/0016808 A1 | 1/2003 | Hu et al. |
| 2003/0041168 A1 | 2/2003 | Musoll |
| 2003/0110455 A1 | 6/2003 | Baumgartner et al. |
| 2003/0174711 A1 | 9/2003 | Shankar |
| 2003/0200363 A1 | 10/2003 | Futral |
| 2003/0223420 A1 | 12/2003 | Ferolito |
| 2004/0008716 A1 | 1/2004 | Stiliadis |
| 2004/0059828 A1 | 3/2004 | Hooper et al. |
| 2004/0095882 A1 | 5/2004 | Hamzah et al. |
| 2004/0133634 A1 | 7/2004 | Luke et al. |
| 2004/0223452 A1 | 11/2004 | Santos et al. |
| 2005/0021837 A1 | 1/2005 | Haselhorst et al. |
| 2005/0047334 A1 | 3/2005 | Paul et al. |
| 2005/0088969 A1 | 4/2005 | Carlsen et al. |
| 2005/0091396 A1 | 4/2005 | Nilakantan et al. |
| 2005/0108444 A1 | 5/2005 | Flauaus et al. |
| 2005/0108518 A1 | 5/2005 | Pandya |
| 2005/0152274 A1 | 7/2005 | Simpson |
| 2005/0182854 A1 | 8/2005 | Pinkerton et al. |
| 2005/0270974 A1 | 12/2005 | Mayhew |
| 2005/0270976 A1 | 12/2005 | Yang et al. |
| 2006/0023705 A1 | 2/2006 | Zoranovic et al. |
| 2006/0067347 A1 | 3/2006 | Naik et al. |
| 2006/0075480 A1 | 4/2006 | Noehring et al. |
| 2006/0174251 A1 | 8/2006 | Pope et al. |
| 2006/0203728 A1 | 9/2006 | Kwan et al. |
| 2007/0061433 A1 | 3/2007 | Reynolds et al. |
| 2007/0070901 A1 | 3/2007 | Aloni et al. |
| 2007/0198804 A1 | 8/2007 | Moyer |
| 2007/0211746 A1 | 9/2007 | Oshikiri et al. |
| 2007/0242611 A1 | 10/2007 | Archer et al. |
| 2007/0268825 A1 | 11/2007 | Corwin et al. |
| 2008/0013453 A1 | 1/2008 | Chiang et al. |
| 2008/0013549 A1 | 1/2008 | Okagawa et al. |
| 2008/0071757 A1 | 3/2008 | Ichiriu et al. |
| 2008/0084864 A1 | 4/2008 | Archer et al. |
| 2008/0091915 A1 | 4/2008 | Moertl et al. |
| 2008/0126553 A1* | 5/2008 | Boucher ............... H04L 69/16 709/230 |
| 2008/0147881 A1 | 6/2008 | Krishnamurthy et al. |
| 2008/0159138 A1 | 7/2008 | Shepherd et al. |

(56) References Cited

U.S. PATENT DOCUMENTS

| | | |
|---|---|---|
| 2008/0253289 A1 | 10/2008 | Naven et al. |
| 2009/0003212 A1 | 1/2009 | Kwan et al. |
| 2009/0010157 A1 | 1/2009 | Holmes et al. |
| 2009/0013175 A1 | 1/2009 | Elliott |
| 2009/0055496 A1 | 2/2009 | Garg et al. |
| 2009/0092046 A1 | 4/2009 | Naven et al. |
| 2009/0141621 A1 | 6/2009 | Fan et al. |
| 2009/0198958 A1 | 8/2009 | Arimilli et al. |
| 2009/0259713 A1 | 10/2009 | Blumrich et al. |
| 2009/0285222 A1 | 11/2009 | Hoover et al. |
| 2010/0061241 A1 | 3/2010 | Sindhu et al. |
| 2010/0169608 A1 | 7/2010 | Kuo et al. |
| 2010/0172260 A1 | 7/2010 | Kwan et al. |
| 2010/0183024 A1 | 7/2010 | Gupta |
| 2010/0220595 A1 | 9/2010 | Petersen |
| 2010/0274876 A1 | 10/2010 | Kagan et al. |
| 2010/0302942 A1 | 12/2010 | Shankar et al. |
| 2010/0316053 A1 | 12/2010 | Miyoshi et al. |
| 2011/0051724 A1 | 3/2011 | Scott et al. |
| 2011/0066824 A1 | 3/2011 | Bestler |
| 2011/0072179 A1 | 3/2011 | Lacroute et al. |
| 2011/0099326 A1 | 4/2011 | Jung et al. |
| 2011/0110383 A1 | 5/2011 | Yang et al. |
| 2011/0128959 A1 | 6/2011 | Bando et al. |
| 2011/0158096 A1 | 6/2011 | Leung et al. |
| 2011/0158248 A1 | 6/2011 | Vorunganti et al. |
| 2011/0164496 A1 | 7/2011 | Loh et al. |
| 2011/0173370 A1 | 7/2011 | Jacobs et al. |
| 2011/0264822 A1 | 10/2011 | Ferguson et al. |
| 2011/0276699 A1 | 11/2011 | Pedersen |
| 2011/0280125 A1 | 11/2011 | Jayakumar |
| 2011/0320724 A1 | 12/2011 | Mejdrich et al. |
| 2012/0093505 A1 | 4/2012 | Yeap et al. |
| 2012/0102506 A1 | 4/2012 | Hopmann et al. |
| 2012/0117423 A1 | 5/2012 | Andrade et al. |
| 2012/0137075 A1 | 5/2012 | Vorbach |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0170462 A1 | 7/2012 | Sinha |
| 2012/0170575 A1 | 7/2012 | Mehra |
| 2012/0213118 A1 | 8/2012 | Lindsay et al. |
| 2012/0250512 A1 | 10/2012 | Jagadeeswaran et al. |
| 2012/0287821 A1 | 11/2012 | Godfrey et al. |
| 2012/0297083 A1 | 11/2012 | Ferguson et al. |
| 2012/0300669 A1 | 11/2012 | Zahavi |
| 2012/0314707 A1 | 12/2012 | Epps et al. |
| 2013/0010636 A1 | 1/2013 | Regula |
| 2013/0039169 A1 | 2/2013 | Schlansker et al. |
| 2013/0060944 A1 | 3/2013 | Archer et al. |
| 2013/0103777 A1 | 4/2013 | Kagan et al. |
| 2013/0121178 A1 | 5/2013 | Mainaud et al. |
| 2013/0136090 A1 | 5/2013 | Liu et al. |
| 2013/0182704 A1 | 7/2013 | Jacobs et al. |
| 2013/0194927 A1 | 8/2013 | Yamaguchi et al. |
| 2013/0201983 A1* | 8/2013 | Ghosh .................. H04L 49/356 370/357 |
| 2013/0203422 A1 | 8/2013 | Masputra et al. |
| 2013/0205002 A1 | 8/2013 | Wang et al. |
| 2013/0208593 A1 | 8/2013 | Nandagopal |
| 2013/0246552 A1 | 9/2013 | Underwood et al. |
| 2013/0290673 A1 | 10/2013 | Archer et al. |
| 2013/0301645 A1 | 11/2013 | Bogdanski et al. |
| 2013/0304988 A1 | 11/2013 | Totolos et al. |
| 2013/0311525 A1 | 11/2013 | Neerincx et al. |
| 2013/0329577 A1 | 12/2013 | Suzuki et al. |
| 2013/0336164 A1 | 12/2013 | Yang et al. |
| 2014/0019661 A1 | 1/2014 | Hormuth et al. |
| 2014/0032695 A1 | 1/2014 | Michels et al. |
| 2014/0036680 A1 | 2/2014 | Lih et al. |
| 2014/0064082 A1 | 3/2014 | Yeung et al. |
| 2014/0095753 A1 | 4/2014 | Crupnicoff et al. |
| 2014/0098675 A1 | 4/2014 | Frost et al. |
| 2014/0119367 A1 | 5/2014 | Han et al. |
| 2014/0122560 A1 | 5/2014 | Ramey et al. |
| 2014/0129664 A1 | 5/2014 | McDaniel et al. |
| 2014/0133292 A1 | 5/2014 | Yamatsu et al. |
| 2014/0136646 A1 | 5/2014 | Tamir et al. |
| 2014/0169173 A1 | 6/2014 | Naouri et al. |
| 2014/0185621 A1 | 7/2014 | Decusatis et al. |
| 2014/0189174 A1 | 7/2014 | Ajanovic et al. |
| 2014/0207881 A1 | 7/2014 | Nussle et al. |
| 2014/0211804 A1 | 7/2014 | Makikeni et al. |
| 2014/0226488 A1 | 8/2014 | Shamis et al. |
| 2014/0241164 A1 | 8/2014 | Cociglio et al. |
| 2014/0258438 A1 | 9/2014 | Ayoub |
| 2014/0301390 A1 | 10/2014 | Scott et al. |
| 2014/0307554 A1 | 10/2014 | Basso et al. |
| 2014/0325013 A1 | 10/2014 | Tamir et al. |
| 2014/0328172 A1 | 11/2014 | Kumar et al. |
| 2014/0347997 A1 | 11/2014 | Bergamasco et al. |
| 2014/0362698 A1 | 12/2014 | Arad |
| 2014/0369360 A1 | 12/2014 | Carlstrom |
| 2014/0379847 A1 | 12/2014 | Williams |
| 2015/0003247 A1 | 1/2015 | Mejia et al. |
| 2015/0006849 A1 | 1/2015 | Xu et al. |
| 2015/0009823 A1 | 1/2015 | Ganga et al. |
| 2015/0026361 A1 | 1/2015 | Matthews et al. |
| 2015/0029848 A1 | 1/2015 | Jain |
| 2015/0055476 A1 | 2/2015 | Decusatis et al. |
| 2015/0055661 A1 | 2/2015 | Boucher et al. |
| 2015/0067095 A1 | 3/2015 | Gopal et al. |
| 2015/0089495 A1 | 3/2015 | Persson et al. |
| 2015/0103667 A1 | 4/2015 | Elias et al. |
| 2015/0124826 A1 | 5/2015 | Edsall et al. |
| 2015/0146527 A1 | 5/2015 | Kishore et al. |
| 2015/0154004 A1 | 6/2015 | Aggarwal |
| 2015/0161064 A1 | 6/2015 | Pope |
| 2015/0180782 A1 | 6/2015 | Rimmer et al. |
| 2015/0186318 A1 | 7/2015 | Kim et al. |
| 2015/0193262 A1 | 7/2015 | Archer et al. |
| 2015/0195388 A1 | 7/2015 | Snyder et al. |
| 2015/0208145 A1 | 7/2015 | Parker et al. |
| 2015/0220449 A1 | 8/2015 | Stark et al. |
| 2015/0229557 A1* | 8/2015 | Kim .................. H04L 45/028 370/392 |
| 2015/0237180 A1 | 8/2015 | Swartzentruber et al. |
| 2015/0244617 A1 | 8/2015 | Nakil et al. |
| 2015/0244804 A1 | 8/2015 | Warfield et al. |
| 2015/0261434 A1 | 9/2015 | Kagan et al. |
| 2015/0263955 A1 | 9/2015 | Talaski et al. |
| 2015/0263994 A1 | 9/2015 | Haramaty et al. |
| 2015/0288626 A1 | 10/2015 | Aybay |
| 2015/0301963 A1* | 10/2015 | Tatar .................. G06F 13/1673 711/154 |
| 2015/0365337 A1 | 12/2015 | Pannell |
| 2015/0370586 A1 | 12/2015 | Cooper et al. |
| 2016/0006664 A1 | 1/2016 | Sabato et al. |
| 2016/0012002 A1 | 1/2016 | Arimilli et al. |
| 2016/0028613 A1 | 1/2016 | Haramaty et al. |
| 2016/0065455 A1 | 3/2016 | Wang et al. |
| 2016/0094450 A1 | 3/2016 | Ghanwani et al. |
| 2016/0134518 A1 | 5/2016 | Callon et al. |
| 2016/0134535 A1 | 5/2016 | Callon |
| 2016/0134559 A1 | 5/2016 | Abel et al. |
| 2016/0134573 A1 | 5/2016 | Gagliardi et al. |
| 2016/0142318 A1 | 5/2016 | Beecroft |
| 2016/0154756 A1 | 6/2016 | Dodson et al. |
| 2016/0182383 A1 | 6/2016 | Pedersen |
| 2016/0205023 A1 | 7/2016 | Janardhanan |
| 2016/0226797 A1 | 8/2016 | Aravinthan et al. |
| 2016/0254991 A1 | 9/2016 | Eckert et al. |
| 2016/0259394 A1 | 9/2016 | Ragavan |
| 2016/0283422 A1 | 9/2016 | Crupnicoff et al. |
| 2016/0285545 A1 | 9/2016 | Schmidtke et al. |
| 2016/0285677 A1 | 9/2016 | Kashyap et al. |
| 2016/0294694 A1 | 10/2016 | Parker et al. |
| 2016/0294926 A1 | 10/2016 | Zur et al. |
| 2016/0301610 A1 | 10/2016 | Amit et al. |
| 2016/0344620 A1 | 11/2016 | G. Santos et al. |
| 2016/0381189 A1 | 12/2016 | Caulfield et al. |
| 2017/0024263 A1 | 1/2017 | Verplanken |
| 2017/0039063 A1 | 2/2017 | Gopal et al. |
| 2017/0041239 A1 | 2/2017 | Goldenberg et al. |

(56) References Cited

U.S. PATENT DOCUMENTS

| | | |
|---|---|---|
| 2017/0048144 A1 | 2/2017 | Liu |
| 2017/0054633 A1 | 2/2017 | Underwood et al. |
| 2017/0063619 A1* | 3/2017 | Hama ............... H04L 41/0816 |
| 2017/0091108 A1 | 3/2017 | Arellano et al. |
| 2017/0093770 A1* | 3/2017 | Flajslik ............... H04L 51/212 |
| 2017/0097840 A1 | 4/2017 | Bridgers |
| 2017/0103108 A1 | 4/2017 | Datta et al. |
| 2017/0118090 A1 | 4/2017 | Pettit et al. |
| 2017/0118098 A1 | 4/2017 | Littlejohn et al. |
| 2017/0153852 A1 | 6/2017 | Ma et al. |
| 2017/0177541 A1 | 6/2017 | Berman et al. |
| 2017/0220500 A1 | 8/2017 | Tong |
| 2017/0237654 A1 | 8/2017 | Turner et al. |
| 2017/0237671 A1 | 8/2017 | Rimmer et al. |
| 2017/0242753 A1 | 8/2017 | Sherlock et al. |
| 2017/0250914 A1 | 8/2017 | Caulfield et al. |
| 2017/0251394 A1 | 8/2017 | Johansson et al. |
| 2017/0270051 A1 | 9/2017 | Chen et al. |
| 2017/0272331 A1 | 9/2017 | Lissack |
| 2017/0272370 A1 | 9/2017 | Ganga et al. |
| 2017/0286316 A1 | 10/2017 | Doshi et al. |
| 2017/0289066 A1 | 10/2017 | Haramaty et al. |
| 2017/0295098 A1 | 10/2017 | Watkins et al. |
| 2017/0324664 A1 | 11/2017 | Xu et al. |
| 2017/0371778 A1 | 12/2017 | McKelvie et al. |
| 2018/0004705 A1 | 1/2018 | Menachem et al. |
| 2018/0019948 A1 | 1/2018 | Patwardhan et al. |
| 2018/0026878 A1 | 1/2018 | Zahavi et al. |
| 2018/0077064 A1 | 3/2018 | Wang |
| 2018/0083868 A1 | 3/2018 | Cheng |
| 2018/0097645 A1 | 4/2018 | Rajagopalan et al. |
| 2018/0097912 A1 | 4/2018 | Chumbalkar et al. |
| 2018/0113618 A1 | 4/2018 | Chan et al. |
| 2018/0115469 A1 | 4/2018 | Erickson et al. |
| 2018/0131602 A1 | 5/2018 | Civanlar et al. |
| 2018/0131678 A1 | 5/2018 | Agarwal et al. |
| 2018/0150374 A1 | 5/2018 | Ratcliff |
| 2018/0152317 A1 | 5/2018 | Chang et al. |
| 2018/0152357 A1 | 5/2018 | Natham et al. |
| 2018/0173557 A1 | 6/2018 | Nakil et al. |
| 2018/0183724 A1 | 6/2018 | Callard et al. |
| 2018/0191609 A1 | 7/2018 | Caulfield et al. |
| 2018/0191742 A1* | 7/2018 | Dawes ............... H04L 63/08 |
| 2018/0198736 A1 | 7/2018 | Labonte et al. |
| 2018/0212876 A1 | 7/2018 | Bacthu et al. |
| 2018/0212902 A1 | 7/2018 | Steinmacher-Burow |
| 2018/0219804 A1 | 8/2018 | Graham et al. |
| 2018/0225238 A1 | 8/2018 | Karguth et al. |
| 2018/0234343 A1 | 8/2018 | Zdornov et al. |
| 2018/0254945 A1 | 9/2018 | Bogdanski et al. |
| 2018/0260324 A1 | 9/2018 | Marathe et al. |
| 2018/0278540 A1 | 9/2018 | Shalev et al. |
| 2018/0287928 A1 | 10/2018 | Levi et al. |
| 2018/0323898 A1 | 11/2018 | Dods |
| 2018/0335974 A1 | 11/2018 | Simionescu et al. |
| 2018/0341494 A1 | 11/2018 | Sood et al. |
| 2019/0007349 A1 | 1/2019 | Wang et al. |
| 2019/0018808 A1 | 1/2019 | Beard et al. |
| 2019/0036771 A1 | 1/2019 | Sharpless et al. |
| 2019/0042337 A1 | 2/2019 | Dinan et al. |
| 2019/0042518 A1 | 2/2019 | Marolia |
| 2019/0044809 A1 | 2/2019 | Willis et al. |
| 2019/0044827 A1 | 2/2019 | Ganapathi et al. |
| 2019/0044863 A1 | 2/2019 | Mula et al. |
| 2019/0044872 A1 | 2/2019 | Ganapathi et al. |
| 2019/0044875 A1 | 2/2019 | Murty et al. |
| 2019/0052327 A1 | 2/2019 | Motozuka et al. |
| 2019/0058663 A1 | 2/2019 | Song |
| 2019/0068501 A1 | 2/2019 | Schneider et al. |
| 2019/0081903 A1 | 3/2019 | Kobayashi et al. |
| 2019/0095134 A1 | 3/2019 | Li |
| 2019/0104057 A1 | 4/2019 | Goel et al. |
| 2019/0104206 A1 | 4/2019 | Goel et al. |
| 2019/0108106 A1 | 4/2019 | Aggarwal et al. |
| 2019/0108332 A1 | 4/2019 | Glew et al. |
| 2019/0109791 A1 | 4/2019 | Mehra et al. |
| 2019/0121781 A1 | 4/2019 | Kasichainula |
| 2019/0140979 A1 | 5/2019 | Levi et al. |
| 2019/0146477 A1 | 5/2019 | Cella et al. |
| 2019/0171612 A1 | 6/2019 | Shahar et al. |
| 2019/0196982 A1 | 6/2019 | Rozas et al. |
| 2019/0199646 A1 | 6/2019 | Singh et al. |
| 2019/0253354 A1 | 8/2019 | Caulfield et al. |
| 2019/0280978 A1 | 9/2019 | Schmatz et al. |
| 2019/0294575 A1 | 9/2019 | Dennison et al. |
| 2019/0306134 A1 | 10/2019 | Shanbhogue et al. |
| 2019/0332314 A1 | 10/2019 | Zhang et al. |
| 2019/0334624 A1 | 10/2019 | Bernard |
| 2019/0356611 A1 | 11/2019 | Das et al. |
| 2019/0361728 A1 | 11/2019 | Kumar et al. |
| 2019/0370214 A1* | 12/2019 | Vidyadhara ......... G06F 13/1642 |
| 2019/0379610 A1 | 12/2019 | Srinivasan et al. |
| 2020/0036644 A1 | 1/2020 | Belogolovy et al. |
| 2020/0084150 A1 | 3/2020 | Burstein et al. |
| 2020/0145725 A1 | 5/2020 | Eberle et al. |
| 2020/0177505 A1 | 6/2020 | Li |
| 2020/0177521 A1 | 6/2020 | Blumrich et al. |
| 2020/0259755 A1 | 8/2020 | Wang et al. |
| 2020/0272579 A1 | 8/2020 | Humphrey et al. |
| 2020/0274832 A1 | 8/2020 | Humphrey et al. |
| 2020/0334195 A1 | 10/2020 | Chen et al. |
| 2020/0349098 A1 | 11/2020 | Caulfield et al. |
| 2021/0081410 A1 | 3/2021 | Chavan et al. |
| 2021/0152494 A1 | 5/2021 | Johnsen et al. |
| 2021/0263779 A1 | 8/2021 | Haghighat et al. |
| 2021/0334206 A1 | 10/2021 | Colgrove et al. |
| 2021/0377156 A1 | 12/2021 | Michael et al. |
| 2021/0409351 A1 | 12/2021 | Das et al. |
| 2022/0131768 A1 | 4/2022 | Ganapathi et al. |
| 2022/0166705 A1 | 5/2022 | Froese |
| 2022/0200900 A1 | 6/2022 | Roweth |
| 2022/0210058 A1 | 6/2022 | Bataineh et al. |
| 2022/0217078 A1 | 7/2022 | Ford et al. |
| 2022/0217101 A1 | 7/2022 | Yefet et al. |
| 2022/0245072 A1 | 8/2022 | Roweth et al. |
| 2022/0278941 A1 | 9/2022 | Shalev et al. |
| 2022/0309025 A1 | 9/2022 | Chen et al. |
| 2023/0035420 A1 | 2/2023 | Sankaran et al. |
| 2023/0046221 A1 | 2/2023 | Pismenny et al. |
| 2023/0208748 A1* | 6/2023 | Goel ............... H04L 43/0817 370/242 |

FOREIGN PATENT DOCUMENTS

| | | |
|---|---|---|
| CN | 110324249 A | 10/2019 |
| CN | 110601888 A | 12/2019 |
| EP | 0275135 A2 | 7/1988 |
| EP | 2187576 A1 | 5/2010 |
| EP | 2219329 A1 | 8/2010 |
| EP | 2947832 A1 | 11/2015 |
| EP | 3445006 A1 | 2/2019 |
| JP | 2003-244196 A | 8/2003 |
| JP | 3459653 B2 | 10/2003 |
| KR | 10-2012-0062864 A | 6/2012 |
| KR | 10-2012-0082739 A | 7/2012 |
| KR | 10-2014-0100529 A | 8/2014 |
| KR | 10-2015-0026939 A | 3/2015 |
| KR | 10-2015-0104056 A | 9/2015 |
| KR | 10-2017-0110106 A | 10/2017 |
| KR | 10-1850749 B1 | 4/2018 |
| WO | 2001/069851 A2 | 9/2001 |
| WO | 02/47329 A2 | 6/2002 |
| WO | 2003/019861 A2 | 3/2003 |
| WO | 2004/001615 A1 | 12/2003 |
| WO | 2005/094487 A2 | 10/2005 |
| WO | 2007/034184 A2 | 3/2007 |
| WO | 2009/010461 A2 | 1/2009 |
| WO | 2009/018232 A1 | 2/2009 |
| WO | 2014/092780 A1 | 6/2014 |
| WO | 2014/137382 A1 | 9/2014 |
| WO | 2014/141005 A1 | 9/2014 |
| WO | 2018/004977 A1 | 1/2018 |

(56) References Cited

FOREIGN PATENT DOCUMENTS

| WO | 2018/046703 A1 | 3/2018 |
|---|---|---|
| WO | 2019/072072 A1 | 4/2019 |

OTHER PUBLICATIONS

International Search Report and Written Opinion received for PCT Patent Application No. PCT/US20/24342, dated Oct. 27, 2020, 10 pages.
International Search Report and Written Opinion received for PCT Patent Application No. PCT/US2020/024192, dated Oct. 23, 2020, 9 pages.
International Search Report and Written Opinion received for PCT Patent Application No. PCT/US2020/024221, dated Oct. 26, 2020, 9 pages.
International Search Report cited in PCT/US2020/024170 dated Dec. 16, 2020; 3 pages.
Maabi, S., et al.; "ERFAN: Efficient reconfigurable fault-tolerant deflection routing algorithm for 3-D Network-on-Chip"; Sep. 6-9, 2016.
Maglione-Mathey, G., et al.; "Scalable Deadlock-Free Deterministic Minimal-Path Routing Engine for InfiniBand-Based Dragonfly Networks"; Aug. 21, 2017; 15 pages.
Mamidala, A.R., et al.; "Efficient Barrier and Allreduce on Infiniband clusters using multicast and adaptive algorithms"; Sep. 20-23, 2004; 10 pages.
Mammeri, Z; "Reinforcement Learning Based Routing in Networks: Review and Classification of Approaches"; Apr. 29, 2019; 35 pages.
Mollah; M. A., et al.; "High Performance Computing Systems. Performance Modeling, Benchmarking, and Simulation: 8th International Workshop"; Nov. 13, 2017.
Open Networking Foundation; "OpenFlow Switch Specification"; Mar. 26, 2015; 283 pages.
Prakash, P., et al.; "The TCP Outcast Problem: Exposing Unfairness in Data Center Networks"; 2011; 15 pages.
Ramakrishnan, K., et al.; "The Addition of Explicit Congestion Notification (ECN) to IP"; Sep. 2001; 63 pages.
Roth, P. C., et al; "MRNet: A Software-Based Multicast/Reduction Network for Scalable Tools1"; Nov. 15-21, 2003; 16 pages.
Silveira, J., et al.; "Preprocessing of Scenarios for Fast and Efficient Routing Reconfiguration in Fault-Tolerant NoCs"; Mar. 4-6, 2015.
Tsunekawa, K.; "Fair bandwidth allocation among LSPs for AF class accommodating TCP and UDP traffic in a Diffserv-capable MPLS network"; Nov. 17, 2005; 9 pages.
Underwood, K.D., et al.; "A hardware acceleration unit for MPI queue processing"; Apr. 18, 2005; 10 pages.
Wu, J.; "Fault-tolerant adaptive and minimal routing in mesh-connected multicomputers using extended safety levels"; Feb. 2000; 11 pages.
Xiang, D., et al.; "Fault-Tolerant Adaptive Routing in Dragonfly Networks"; Apr. 12, 2017; 15 pages.
Xiang, D., et al; "Deadlock-Free Broadcast Routing in Dragonfly Networks without Virtual Channels", submission to IEEE transactions on Parallel and Distributed Systems, 2015, 15 pages.
Awerbuch, B., et al.; "An On-Demand Secure Routing Protocol Resilient to Byzantine Failures"; Sep. 2002; 10 pages.
Belayneh L.W., et al.; "Method and Apparatus for Routing Data in an Inter-Nodal Communications Lattice of a Massively Parallel Computer System by Semi-Randomly Varying Routing Policies for Different Packets"; 2019; 3 pages.
Bhatele, A., et al.; "Analyzing Network Health and Congestion in Dragonfly-based Supercomputers"; May 23-27, 2016; 10 pages.
Blumrich, M.A., et al.; "Exploiting Idle Resources in a High-Radix Switch for Supplemental Storage"; Nov. 2018; 13 pages.
Chang, F., et al.; "PVW: Designing Vir PVW: Designing Virtual World Ser orld Server Infr er Infrastructur astructure"; 2010; 8 pages.
Chang, F., et al.; "PVW: Designing Virtual World Server Infrastructure"; 2010; 8 pages.
Chen, F., et al ..; "Requirements for RoCEv3 Congestion Management"; Mar. 21, 2019; 8 pages.
Cisco Packet Tracer; "packet-tracer;—ping"; https://www.cisco.com/c/en/us/td/docs/security/asa/asa-command-reference/I-R/cmdref2/p1.html; 2017.
Cisco; "Understanding Rapid Spanning Tree Protocol (802.1w)"; Aug. 1, 2017; 13 pages.
Eardley, EE, P; "Pre-Congestion Notification (PCN) Architecture"; Jun. 2009; 54 pages.
Escudero-Sahuquillo, J., et al.; "Combining Congested-Flow Isolation and Injection Throttling in HPC Interconnection Networks"; Sep. 13-16, 2011; 3 pages.
Hong, Y.; "Mitigating the Cost, Performance, and Power Overheads Induced by Load Variations in Multicore Cloud Servers"; Fall 2013; 132 pages.
Huawei; "The Lossless Network for Data Centers"; Nov. 7, 2017; 15 pages.
International Search Report and Written Opinion received for PCT Application No. PCT/US2020/024248, dated Jul. 8, 2020, 11 pages.
International Search Report and Written Opinion received for PCT Application No. PCT/US20/24332, dated Jul. 8, 2020, 13 pages.
International Search Report and Written Opinion received for PCT Application No. PCT/US20/24243, dated Jul. 9, 2020, 10 pages.
International Search Report and Written Opinion received for PCT Application No. PCT/US20/24253, dated Jul. 6, 2020, 12 pages.
International Search Report and Written Opinion received for PCT Application No. PCT/US20/24256, dated Jul. 7, 2020, 11 pages.
International Search Report and Written Opinion received for PCT Application No. PCT/US20/24257, dated Jul. 7, 2020, 10 pages.
International Search Report and Written Opinion received for PCT Application No. PCT/US20/24258, dated Jul. 7, 2020, 9 pages.
International Search Report and Written Opinion received for PCT Application No. PCT/US20/24259, dated Jul. 9, 2020, 13 pages.
International Search Report and Written Opinion received for PCT Application No. PCT/US20/24260, dated Jul. 7, 2020, 11 pages.
International Search Report and Written Opinion received for PCT Application No. PCT/US20/24268, dated Jul. 9, 2020, 11 pages.
International Search Report and Written Opinion received for PCT Application No. PCT/US20/24269, dated Jul. 9, 2020, 11 pages.
International Search Report and Written Opinion received for PCT Application No. PCT/US20/24339, dated Jul. 8, 2020, 11 pages.
International Search Report and Written Opinion received for PCT Application No. PCT/US2020/024125, dated Jul. 10, 2020, 5 pages.
International Search Report and Written Opinion received for PCT Application No. PCT/US2020/024129, dated Jul. 10, 2020, 11 pages.
International Search Report and Written Opinion received for PCT Application No. PCT/US2020/024237, dated Jul. 14, 2020, 5 pages.
International Search Report and Written Opinion received for PCT Application No. PCT/US2020/024239, dated Jul. 14, 2020, 11 pages.
International Search Report and Written Opinion received for PCT Application No. PCT/US2020/024242, dated Jul. 6, 2020, 11 pages.
International Search Report and Written Opinion received for PCT Application No. PCT/US2020/024244, dated Jul. 13, 2020, 10 pages.
International Search Report and Written Opinion received for PCT Application No. PCT/US2020/024245, dated Jul. 14, 2020, 11 pages.
International Search Report and Written Opinion received for PCT Application No. PCT/US2020/024246, dated Jul. 14, 2020, 10 pages.
International Search Report and Written Opinion received for PCT Application No. PCT/US2020/024250, dated Jul. 14, 2020, 12 pages.
International Search Report and Written Opinion received for PCT Application No. PCT/US2020/024254, dated Jul. 13, 2020, 10 pages.
International Search Report and Written Opinion received for PCT Application No. PCT/US2020/024262, dated Jul. 13, 2020, 10 pages.

(56) References Cited

OTHER PUBLICATIONS

International Search Report and Written Opinion received for PCT Application No. PCT/US2020/024266, dated Jul. 9, 2020, 10 pages.
International Search Report and Written Opinion received for PCT Application No. PCT/US2020/024270, dated Jul. 10, 2020, 13 pages.
International Search Report and Written Opinion received for PCT Application No. PCT/US2020/024271, dated Jul. 9, 2020, 10 pages.
International Search Report and Written Opinion received for PCT Application No. PCT/US2020/024272, dated Jul. 9, 2020, 10 pages.
International Search Report and Written Opinion received for PCT Application No. PCT/US2020/024276, dated Jul. 13, 2020, 9 pages.
International Search Report and Written Opinion received for PCT Application No. PCT/US2020/024304, dated Jul. 15, 2020, 11 pages.
International Search Report and Written Opinion received for PCT Application No. PCT/US2020/024311, dated Jul. 17, 2020, 8 pages.
International Search Report and Written Opinion received for PCT Application No. PCT/US2020/024321, dated Jul. 9, 2020, 9 pages.
International Search Report and Written Opinion received for PCT Application No. PCT/US2020/024324, dated Jul. 14, 2020, 10 pages.
International Search Report and Written Opinion received for PCT Application No. PCT/US2020/024327, dated Jul. 10, 2020, 15 pages.
International Search Report and Written Opinion received for PCT Application No. PCT/US2020/24158, dated Jul. 6, 2020, 18 pages.
International Search Report and Written Opinion received for PCT Application No. PCT/US2020/24251, dated Jul. 6, 2020, 11 pages.
International Search Report and Written Opinion received for PCT Application No. PCT/US2020/24267, dated Jul. 6, 2020, 9 pages.
International Search Report and Written Opinion received for PCT Patent Application No. PCT/US20/24303, dated Oct. 21, 2020, 9 pages.
Ramakrishnan et al., RFC 3168, "The addition of Explicit Congestion Notification (ECN) to IP", Sep. 2001 (Year: 2001).
Extended European Search Report and Search Opinion received for EP Application No. 20809930.9, dated Mar. 2, 2023, 9 pages.
Extended European Search Report and Search Opinion received for EP Application No. 20810784.7, dated Mar. 9, 2023, 7 pages.
International Search Report and Written Opinion received for PCT Application No. PCT/US2020/024241, dated Jul. 14, 2020, 13 pages.

* cited by examiner

SYSTEM AND METHOD FOR FACILITATING EFFICIENT PACKET FORWARDING USING A MESSAGE STATE TABLE IN A NETWORK INTERFACE CONTROLLER (NIC)

BACKGROUND

Field

This is generally related to the technical field of networking. More specifically, this disclosure is related to systems and methods for facilitating MPI (message passing interface) list matching for out-of-order packets in a network interface controller (NIC).

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

The disclosed embodiments provide a network interface controller (NIC) capable of performing message passing interface (MPI) list matching for out-of-order packets. The NIC can include a storage device, a network interface, a hardware list-processing engine (LPE), and a message state table (MST) logic block. The storage device can store an MST. The network interface can couple the NIC to a network. The LPE can perform message matching on a first packet of a message received via the network interface. The MST logic block can store results of the message matching in the MST and receive a request to read the results of the message matching from the MST if the NIC receives a second packet associated with the message.

BRIEF DESCRIPTION OF THE FIGURES

In the figures, like reference numerals refer to the same figure elements.

DETAILED DESCRIPTION

Figure 1:
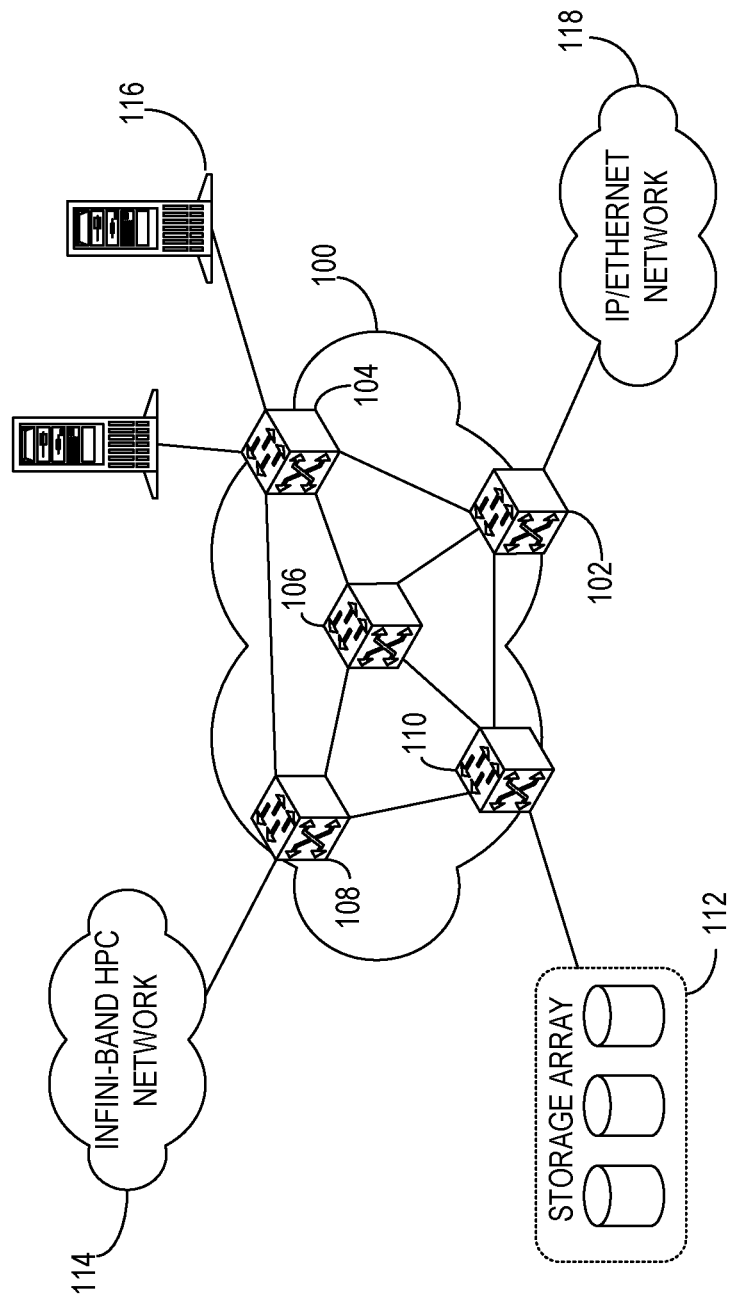
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate MPI list matching for out-of-order packets of a multi-packet message or a retry packet for a single-packet message in a network interface controller (NIC). The NIC can include a message state table (MST) logic block having a plurality of interfaces for interfacing with other logic blocks of the NIC. More specifically, the MST logic block can include a match interface that can receive list-matching results for a first packet of a multi-packet message and an MST memory logic block for storing the list-matching results (which can include at least the target memory address and length) together with other header information generated by the list-processing engine (LPE). When subsequent continuation packets for the same message are received, which can be out of order, instead of requiring the list-processing engine to perform list matching again, the MST memory can be queried to provide the matching results. The MST can also be used to store matching results of unrestricted single packets, which can be used in the event of a retry.

One embodiment provides a NIC. The NIC can include a storage device, a network interface, a hardware list-processing engine (LPE), and an MST logic block. The storage device can store an MST. The network interface can couple the NIC to a network. The LPE can perform message matching on a first packet of a message received via the network interface. The MST logic block can store results of the message matching in the MST and receive a request to read the results of the message matching from the MST if the NIC receives a second packet associated with the message.

In a variation on this embodiment, the message is associated with a direct memory access (DMA) or a remote direct memory access (RDMA) operation.

In a further variation, the message can include a multi-packet PUT message, a GET message, or a single-packet atomic memory operations (AMO) message.

In a further variation, the message includes a multi-packet PUT message. The first packet is the initial packet of the multi-packet PUT message, the second packet is a continuation packet in the message, and the second packet is delivered out of order.

In a further variation, the message includes a single-packet message, and the second packet belongs to a retry message of the single-packet message.

In a variation on this embodiment, the MST logic block can set a bit associated with an entry in the MST when the LPE provides message-matching results for a message associated with the entry.

In a further variation, a request to read the message-matching results associated with the entry is processed subsequent to the bit associated with the entry being set.

In a variation on this embodiment, the MST logic block can arbitrate among respective head requests of a plurality of request queues for providing access to the MST.

In a variation on this embodiment, the MST logic block can generate a completion event in response to the network interface controller receiving a response to a last packet associated with the message. The MST can then deallocate an entry from the MST corresponding to the message.

In a variation on this embodiment, a respective entry in the MST is associated with an index, and wherein the index is available for reuse subsequent to the corresponding entry being deallocated from the MST.

Figure 2A:
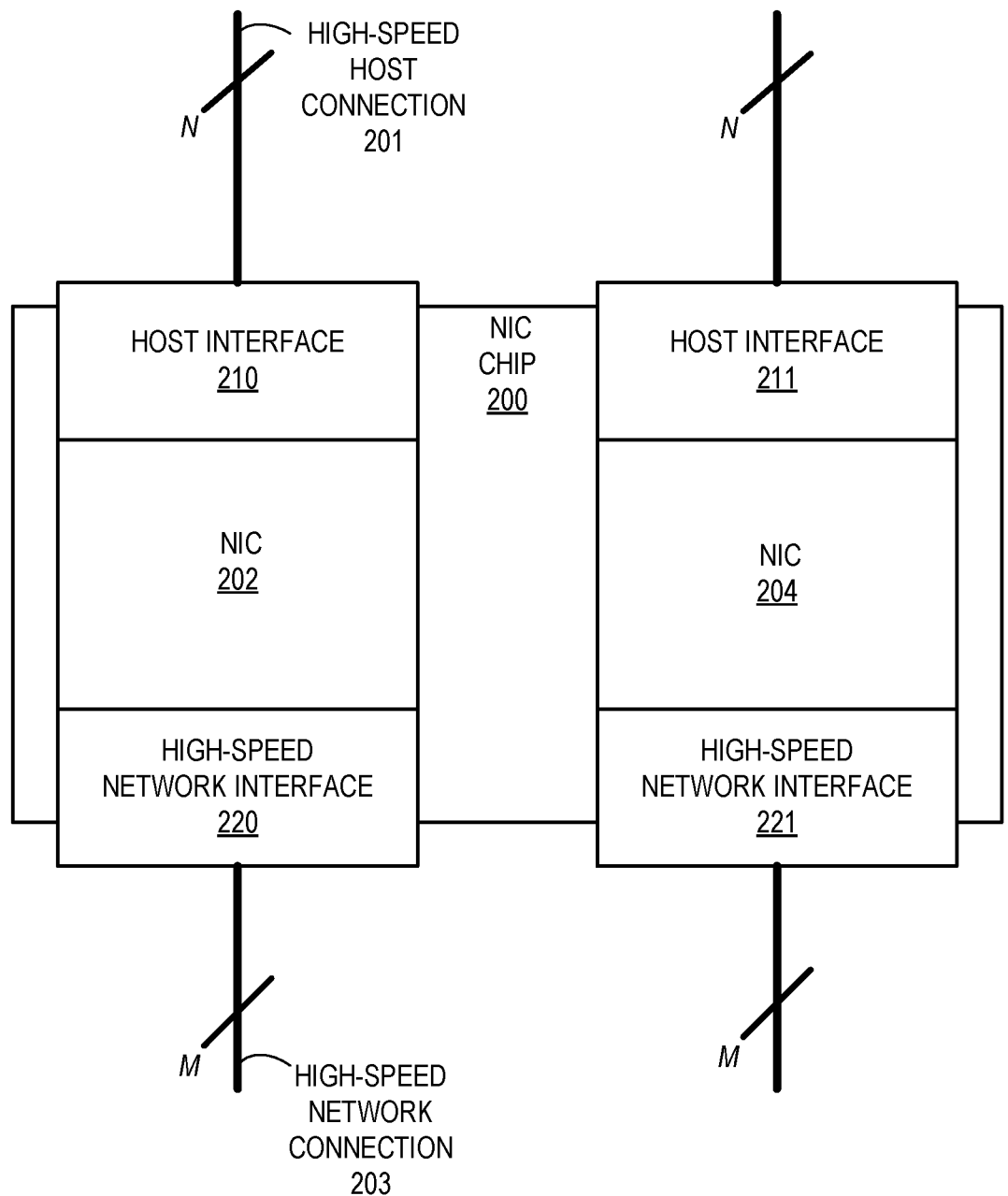
FIG. 2A shows an exemplary NIC chip with a plurality of NICs.

In this disclosure, the description in conjunction with FIG. 1 is associated with the network architecture, and the description in conjunction with FIG. 2A and onward provide more details on the architecture and operations associated with a NIC that supports efficient list matching for out-of-order packets.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one high-speed network interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on message passing interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and atomic memory operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
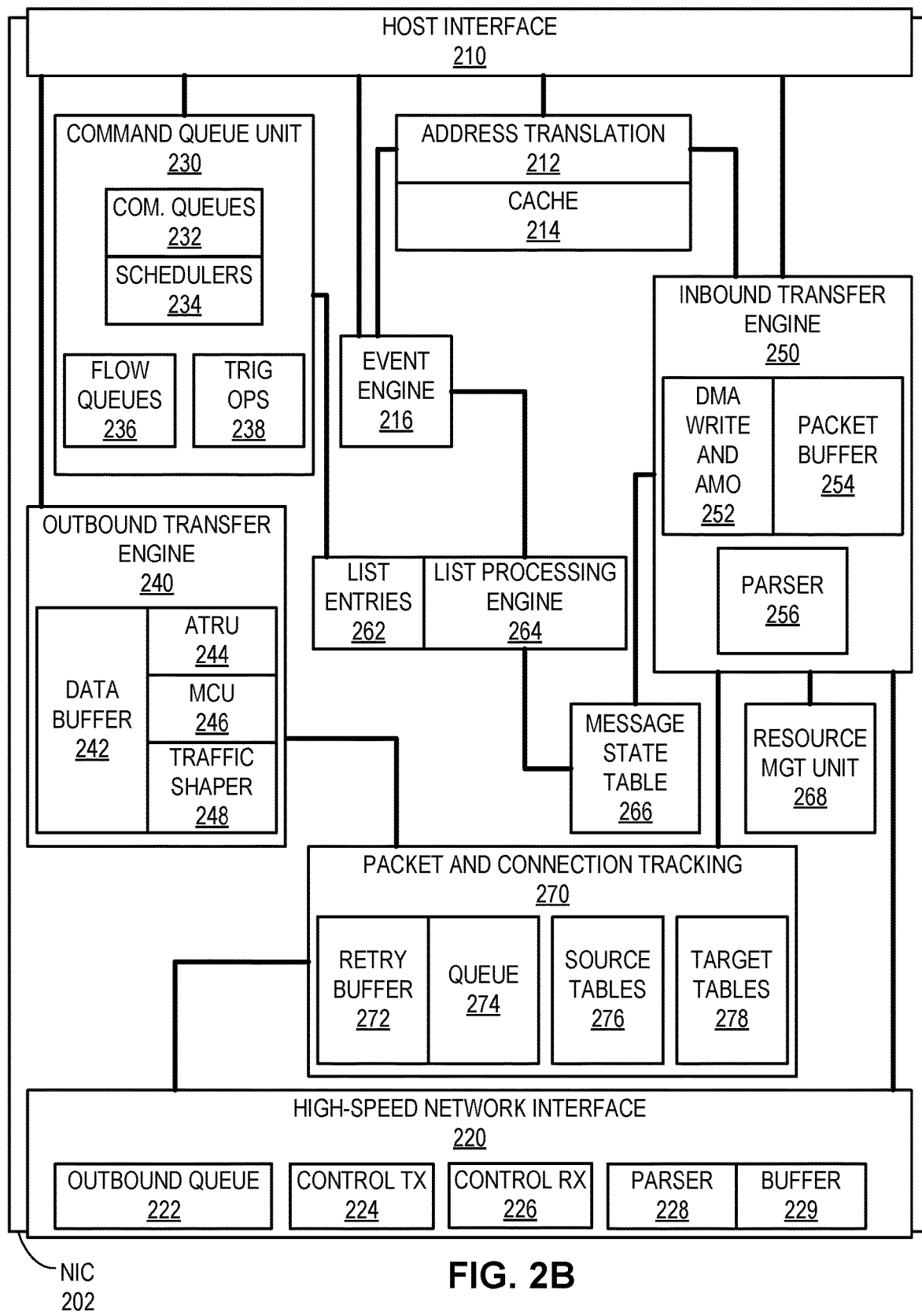
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a command queue (CQ) unit 230. CQ unit 230 can be responsible for fetching and issuing host side commands. CQ unit 230 can include command queues 232 and schedulers 234. Command queues 232 can include two independent sets of queues for initiator commands (PUT, GET, etc.) and target commands (append, search, etc.), respectively. Command queues 232 can be implemented as circular buffers. In some embodiments, command queues 232 can be maintained in the main memory of the host. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The data received from the host can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be obtained from retry buffer 272 to facilitate the retry operation. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a message state table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Message State Table

In MPI, send/receive operations can be identified with an envelope that can include a number of parameters such as source, destination, message ID, and communicator. The envelope can be used to match a given message to its corresponding user buffer. The whole list of buffers posted by a given process is referred to as the matching list, and the process of finding the corresponding buffer from the matching list to a given buffer is referred to as list matching or tag matching.

In some embodiments, processing of the MPI messages, including both the "eager" message and the "rendezvous" message, can be offloaded to the NIC hardware, which can also provide hardware acceleration of MPI list matching. However, the MPI lists can be required to be matched in order. In situations where packets are received out of order, the list-processing engine in the NIC cannot maintain order and can produce incorrect matching results. Note that out-of-order delivery of network packets can provide certain performance advantages and can sometimes be the preferred packet-delivery method.

For example, an application, which may run on a source device of a NIC, can issue a message indicating a data operation (e.g., a "GET" or a "PUT" command of remote direct memory access (RDMA)) for a memory location of a remote target device. The NICs of the source and target devices can be referred to as the source and target NICs, respectively. The operation can be an idempotent or a non-idempotent operation. An idempotent operation may be executed more than once without causing an error. On the other hand, a non-idempotent operation can be executed once. Executing a non-idempotent operation more than once may cause an error. Typically, if an idempotent RDMA operation is not completed, instead of the target NIC executing the operation, the software of the target device (e.g., an operating system) may replay the operation.

The message indicating the operation can be a large message that may be transmitted via a plurality of packets. Ordered delivery of such a large message may incur significant overhead, such as transmission over a predetermined path, strict enforcement of in-order packet transmission, and packet drops for out-of-order packets, which can lead to inefficient data forwarding. To solve this problem, the source NIC can use both ordered and unordered packet delivery for the message to improve performance while preserving order at message boundaries. In particular, if the message is for an idempotent operation, the NIC may send some of the packets based on unordered delivery. During operation, the source NIC may receive a message larger than a maximum transmission unit (MTU). Accordingly, the source NIC can generate a plurality of packets from the message based on the MTU. Since the plurality of packets may include a portion of the message in their respective payloads, these packets can be referred to as a packet stream. The source NIC can send a first packet using ordered delivery to the target NIC. Subsequent to receiving a response to the first packet, the source NIC can determine whether the number of the remaining packets of the packet stream is greater than a threshold. In some embodiments, the threshold can correspond to a packet number for which the transfer time is greater than twice the round-trip time (RTT) between the source and target NICs.

If the number of remaining packets is greater than the threshold, the source NIC can initiate an in-out-in (IOI) packet transfer for the packet stream. To facilitate IOI packet transfer, the source NIC can forward an initial set of packets with ordered delivery. Each of these packets can include a sequence number and an indicator indicating in-order delivery. The target NIC may receive one or more packets, and issue corresponding responses. A response can also be a cumulative response since these packets are ordered packets. However, since the responses may not be ordered, the source NIC may receive any of the responses. Based on the first received response, the source NIC can determine that all packets up to the sequence number of the response have been successfully received by the target NIC.

The source NIC can then switch to unordered delivery for the subsequent packets. When the number of remaining packets becomes less than a switchover threshold (i.e., the packets with the end of the message), the source NIC can switch back to ordered delivery. In some embodiments, the switchover threshold can indicate the number of outstanding packets. An outstanding packet is a packet for which the source NIC has not received a response yet. To further ensure that the last packet is delivered in order, the source NIC may refrain from sending the last packet of the packet stream until the source NIC has received responses for all unordered packets. In this way, the source NIC can use IOI packet transfer that can incorporate both ordered and unordered packet delivery, thereby facilitating efficient packet forwarding for large messages.

To facilitate the IOI packet transfer, the NIC can implement a message state table (MST), which stores previous results of message matching. The NIC can store the MST in a storage device (e.g., a memory module) of the NIC. For example, the MST can store the matching result of an initial packet of the packet stream, which is delivered in order. When subsequent packets of the same packet stream are received, rather than having the list-processing engine to perform list matching and preserve order, the MST can be queried to obtain the corresponding matching result.

Figure 3:
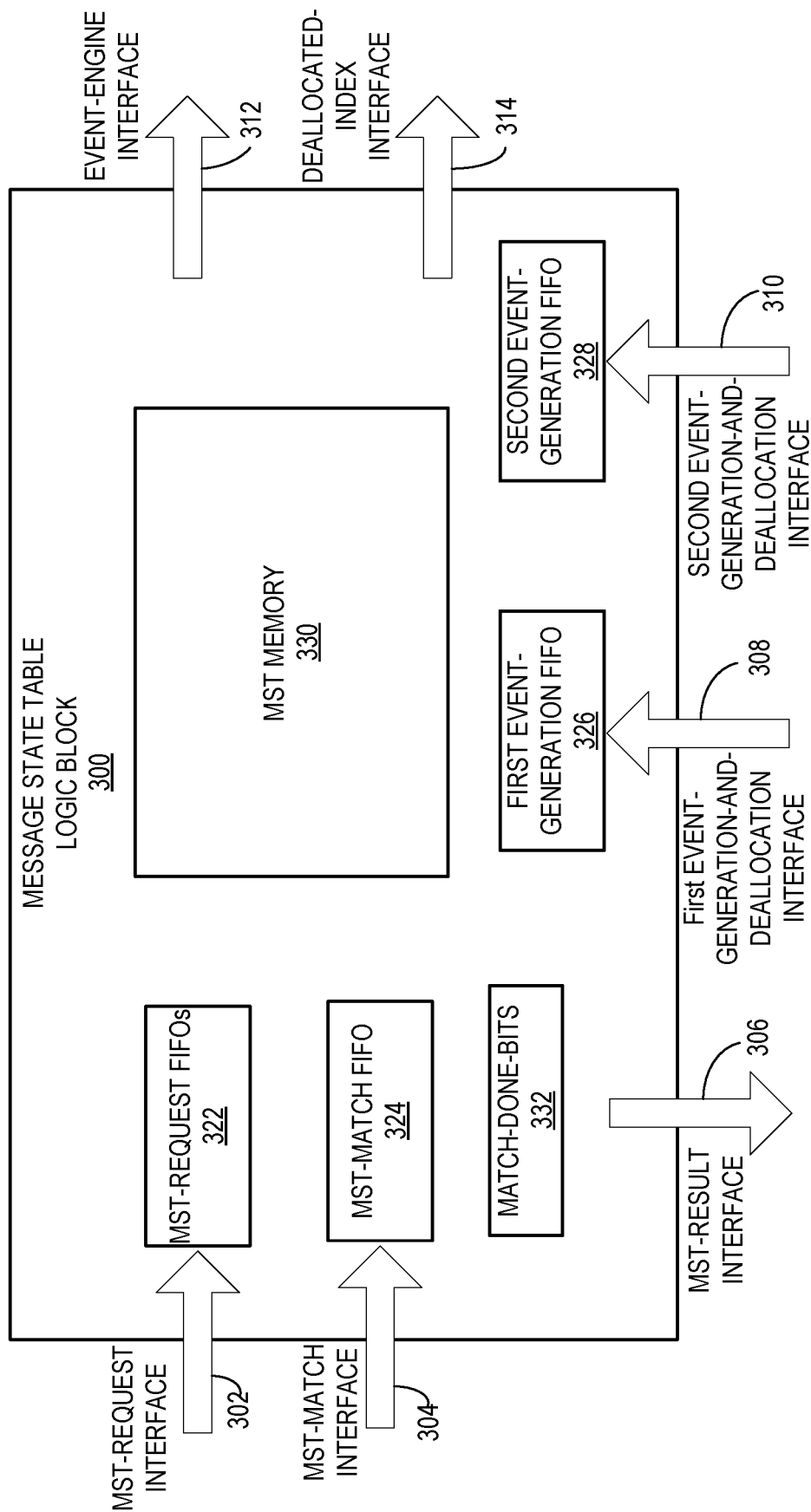
FIG. 3 shows an exemplary architecture of the message state table (MST) logic block.

FIG. 3 shows an exemplary architecture of the MST logic block. MST logic block 300 can include a plurality of interfaces and a plurality of subblocks that operate together and also interface with other blocks in the NIC to facilitate the list-matching operation for out-of-order packets.

The interfaces of MST logic block 300 can include an MST-request interface 302, an MST-match interface 304, a MST-result interface 306, a first event-generation-and-deallocation interface 308, and a second event-generation-and-deallocation interface 310, an event-engine interface 312, and a deallocated-index interface 314. The subblocks of MST logic block 300 can include a set of MST-request first-in, first-out (FIFO) queues 322, an MST-match FIFO 324, a first event-generation FIFO 326, a second event-generation FIFO 328, an MST memory 330, and a match-done-bits data block 332.

MST-request interface 302 can allow MST logic block 300 to receive requests from the IXE to read the matching result for each communication packet of an unrestricted message. Note that the NIC can support both restricted and unrestricted transfers, which differ in their ordering and in their target behavior. Restricted transfers may be unordered and unrestricted transfers require ordering to be maintained, at least at the message level. Note that restricted PUT, GET, and AMO operations may not use MST logic block 300.

MST-match interface 304 can allow MST logic block 300 to receive matching results for an unrestricted message from the IXE. This update may occur on the first packet of the message. MST-result interface 306 can allow MST logic block 300 to return back the matching result stored in MST memory 330.

First event-generation-and-deallocation interface 308 can allow MST logic block 300 to receive a notification from the packet and connection tracking (PCT) module, when the PCT module receives a clear request for the last packet of an unrestricted single- or multi-packet GET message, the notification can cause MST logic block 300 to generate a completion event and deallocate the corresponding entry for that GET message. This path also includes packet error notification.

Second event-generation-and-deallocation interface 310 can provide a path for MST logic block 300 to receive two types of commands from the PCT packet-out block. The first type of command is event generation and deallocation. When the last response of a multi-packet unrestricted PUT message is sent out by the PCT packet-out block, it notifies the MST to generate a completion event and deallocate the entry for that message. The second type of command can be a command indicating a packet error for a PUT or GET message. When the PCT module sends out an error response packet of either an unrestricted multi-packet PUT message or an unrestricted single- or multi-packet GET message, the PCT module notifies MST logic block 300 and the error is logged in the MST entry for that message.

Event-engine interface 312 may allow MST logic block 300 to generate and send an event to the event engine after a message has been complete. Deallocated-index interface 314 may allow MST logic block 300 to notify the PCT module that an entry has been deallocated and the MST index can be reused.

MST-request FIFOs 322 can include a set of FIFOs that accept MST requests from the IXE via MST-request interface 302. In some embodiments, MST-request FIFOs 322 can include 32 linked-list FIFOs. MST-match FIFO 324 is a FIFO that accepts MST matching results from the IXE via MST-match interface 304.

First event-generation FIFO 326 can include a FIFO that accepts event-generation/deallocation requests from the PCT target-side clear engine via first event-generation-and-deallocation interface 308. Second event-generation FIFO 328 can include a FIFO that accepts event-generation/deallocation request and PUT and GET error updates for messages from the PCT packet outbound path via second event-generation-and-deallocation interface 310.

MST memory 330 can include a table that stores the matching results (which can include at least the target memory address and length) together with other header information generated by the LPE. In some embodiments, MST memory 330 can include a table that can hold 2048 entries. MST memory 330 can include a content-addressable memory (CAM) that can be used to identify the entry in the table to use for a message. In some embodiments, the CAM can be located in the PCT module. The PCT module is responsible for managing the credits and allocation of the MST entries. Before the IXE sends in an MST request or MST match to MST logic block 300, the IXE may obtain the MST index from the PCT. The request can then be sent, via the appropriate interface, to MST logic block 300 along with the index that it is assigned.

Match-done-bits data block 332 can include a set of bits that specify whether matching results have been provided for each of the messages. In the event that MST memory logic block 300 includes a 2K-entry table, the set of bits can include 2048 bits.

Figure 4A:
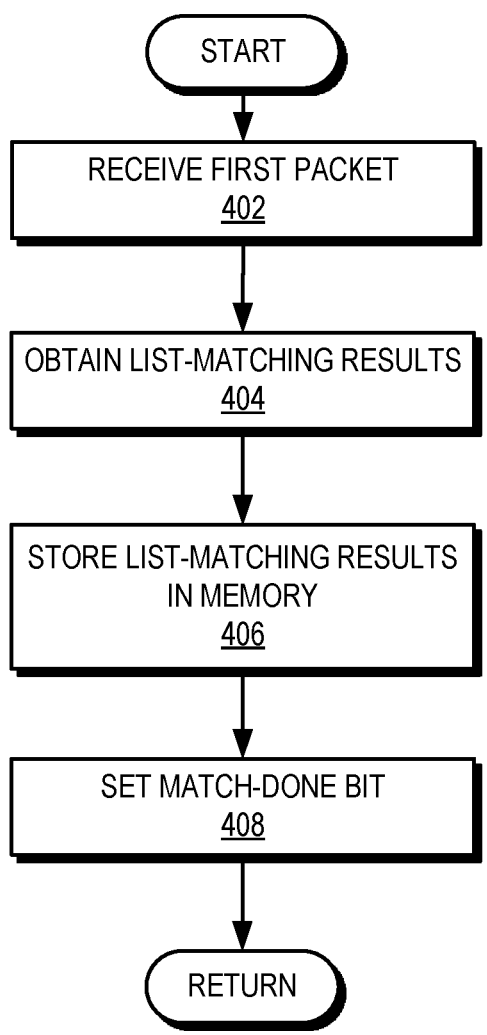
FIG. 4A shows a flowchart illustrating the exemplary process of storing list-matching results in the MST.

FIG. 4A shows a flowchart illustrating the exemplary process of storing list-matching results in the MST. At the target NIC, the IXE can receive the initial packet of an unrestricted message (operation 402) and subsequently obtain the list-matching results that include the target address and other information for this message through a list-matching process (operation 404). The initial packet can include the message envelope. The list-matching process can be performed by a hardware list-processing engine. The unrestricted message can be associated with a DMA or RDMA operation (e.g., PUT or GET). For multi-packet PUT and all GET messages, the IXE can send the matching results to the MST. The matching results can be sent to MST-match FIFO via the MST-match interface.

Subsequent to MST memory block, which holds the MST, storing the matching results forwarded by the MST-match FIFO (operation 406), the MST can set a corresponding "match-done" bit (operation 408), indicating that the matching results are available and can be used when processing the rest of the message.

Figure 4B:
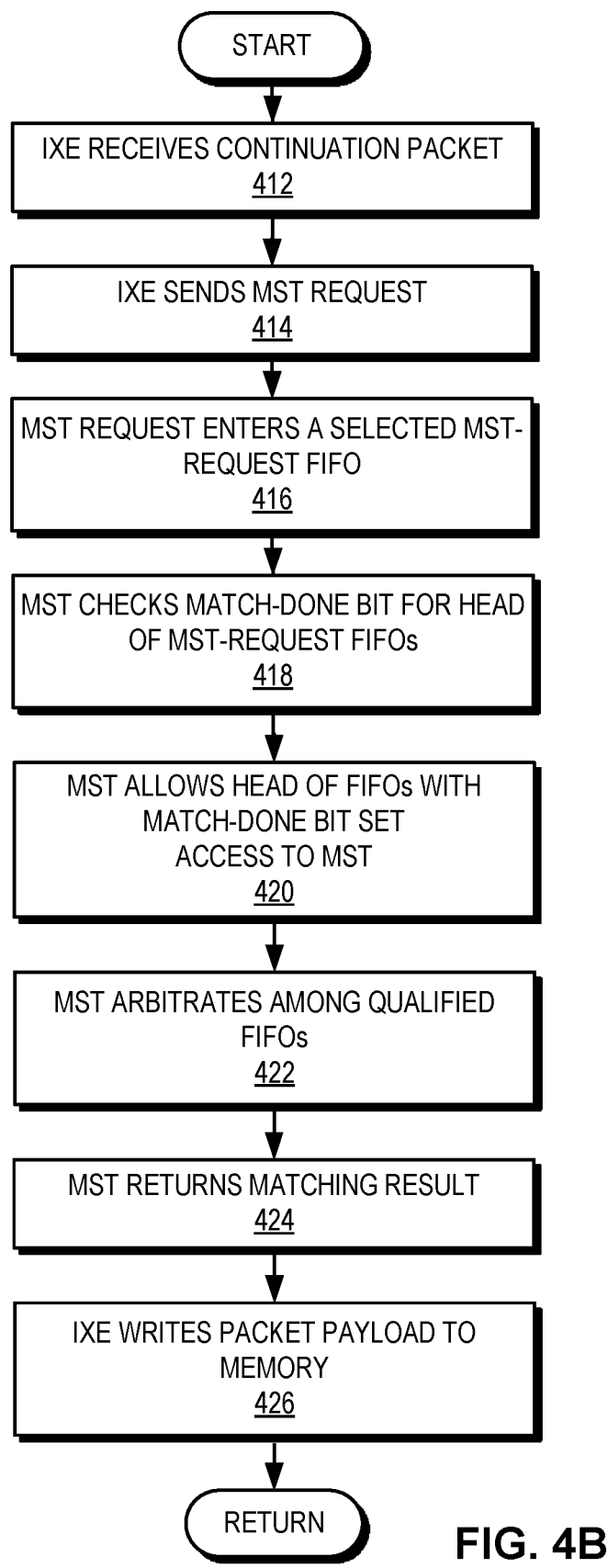
FIG. 4B shows a flowchart illustrating the exemplary process of obtaining list-matching results from the MST.

FIG. 4B shows a flowchart illustrating the exemplary process of obtaining list-matching results from the MST. During operation, the IXE of the target NIC can receive a subsequent continuation packet for a message (operation 412), and send an MST request to read back the matching result of the message via the MST-request interface (operation 414). The MST request can enter one of the MST-request FIFOs (operation 416). In some embodiments, the MST logic block can select an MST-request FIFO to enqueue the MST request based on a hashed result of the MST index and the traffic class (TC) number of the request. The MST index can have multiple bits (e.g., 11-bit) and the TC number can have a smaller set of bits (e.g., 3-bit).

The MST can check the corresponding "match-done" bit of the head of each FIFO to determine if it is set and if there is a credit available to return the matching results via the match-result interface (operation 418). If so, the MST request at the head of the FIFO is allowed to access the MST (operation 420). This is because the continuation packet may arrive before the matching result of the first packet has arrived. This qualification process allows the MST logic block to block the progress of the continuation packets until the result of the match is available. When checking for credit availability for returning the result of a match request, the MST logic block can use two credit pools dependent on whether the request is a PUT or a GET. Each type of message gets its own credit pool.

All qualified FIFOs can be arbitrated (e.g., using round-robin) to access the MST (operation 422). The matching result corresponding to the granted match request can then be returned to the IXE via the MST-result interface (operation 424). Once the IXE obtains the matching result for each continuation packet, the IXE can write the payload data to memory (operation 426).

In the examples shown in FIGS. 4A-4B, the MST is used for unrestricted multi-packet messages. In practice, the MST can also store the matching results for unrestricted single-packet GET messages. The matching result for such a message can be sent through by the IXE to the MST via the MST-match interface. There is no continuation packet for this type of message, and the MST is only used for remembering the matching result in case of a retry. In the case of the retry, when the IXE requests the MST index, the PCT will return the already existing MST index, and the information that the packet is a retry packet. This allows the IXE to recover the original matching results from the MST entry. On the other hand, sending the match request to the LPE a second time would be an error.

In addition, the MST may not be used for any other single-packet requests. However, the MST is not used for any restricted messages. Matching results can be read from the MST for continuation packets, which may be delivered in any order.

The processing of the retry packets depends on the packet type. If the retry packet is an unrestricted GET, an MST request can be sent to read back the matching result via the MST-request interface and the MST-request FIFOs. This is because the matching operation performed by the LPE may not be idempotent. To replay the GET response, the IXE may need to obtain the original matching result stored in the MST. If the retry packet is an unrestricted PUT or AMO, the PCT can detect that the request is a retry and then recreates a response from the target result store (TRS) and directs the IXE to drop the packet. The TRS can store packet-level information for non-idempotent operations. Hence, the MST is not accessed.

The MST can also log errors that have occurred at the message level for unrestricted multi-packet PUT or GET messages, and unrestricted single-packet GET messages. When the PCT sends out an error response packet for either an unrestricted multi-packet PUT message or an unrestricted single- or multi-packet GET message, an error notification can be sent to the MST through the second event-generation FIFO and the second event-generation-and-deallocation interface. These errors are accumulated in the corresponding MST entries.

It is also the responsibility of the MST logic block to generate and send an event to the event engine through the event-engine interface once a message that it is tracking is complete. For an unrestricted multi-packet PUT message, once its last-response packet is sent out by the PCT, the MST logic block can be notified to generate an event and also to deallocate the entry through a path that includes the second event-generation FIFO and the second event-generation-and-deallocation interface. For an unrestricted single-packet or multi-packet GET message, after a "clear" command is received by the PCT for the message, indicating that a response to the last packet in the message is received, the MST logic block is notified to generate the event and also to deallocate the MST entry through a path that includes the first event-generation FIFO and the first event-generation-and-deallocation interface. These notifications pass through the first and second event-generation FIFOs before arbitrating for access of the MST to generate the event. Once the event is generated, it is sent to the event engine through the event-engine interface. The corresponding MST entry is then deallocated from the MST and the index of the entry can be sent back to the PCT for reuse through the deallocated-Index interface.

Exemplary Computer System

Figure 5:
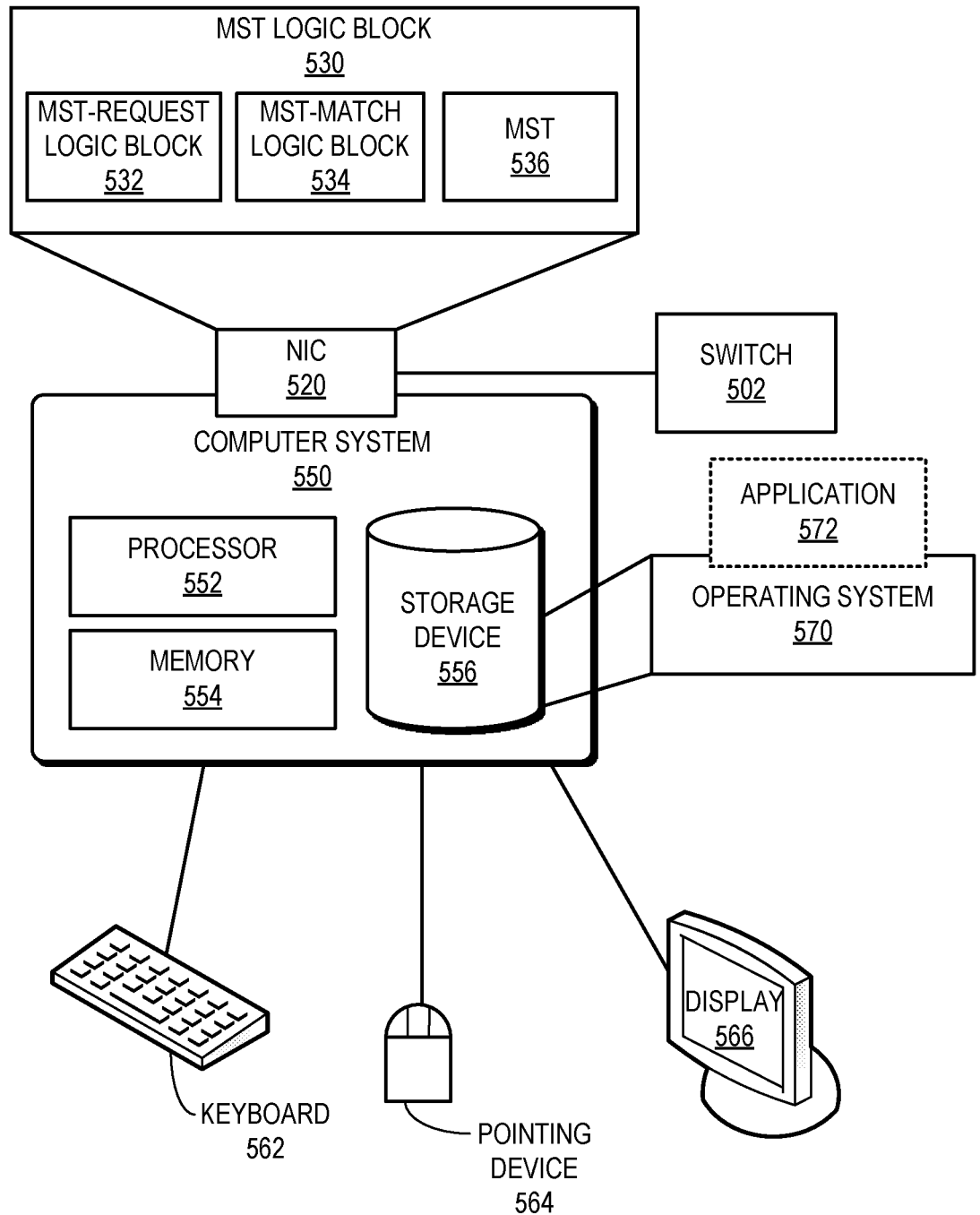
FIG. 5 shows an exemplary computer system equipped with a NIC that facilitates MPI list matching for out-of-order packets.

FIG. 5 shows an exemplary computer system equipped with a NIC that facilitates MPI list matching for out-of-order packets. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates MPI list matching for out-of-order packets. NIC 520 can provide one or more HNIs to computer system 550. NIC 520 can be coupled to a switch 502 via one of the HNIs. NIC 520 can include a MST logic block 530, as described in conjunction with FIG. 2B and FIG. 3. MST logic block 530 can include an MST-request logic block 532 that receives MST requests, an MST-match logic block 534 that may receive matching results from the list-matching engine, and an MST 536 for storing the matching results.

In summary, the present disclosure describes a NIC that implements an MST. The NIC can include a storage device, a network interface, a hardware LPE, and an MST logic block. The storage device can store an MST. The network interface can couple the NIC to a network. The LPE can perform message matching on a first packet of a message received via the network interface. The MST logic block can store results of the message matching in the MST and receive a request to read the results of the message matching from the MST if the NIC receives a second packet associated with the message.

The methods and processes described above can be performed by hardware logic blocks, modules, logic blocks, or apparatus. The hardware logic blocks, modules, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A network interface controller (NIC), comprising:
   a storage device to store a message state table (MST);
   a network interface to couple a network;
   a hardware list-processing engine (LPE) to perform message matching on a first packet of a message received via the network interface; and
   an MST logic block to:
      store results of the message matching in the MST;
      receive a request to read the results of the message matching from the MST in response to the network interface controller receiving a second packet associated with the message;
      set a bit associated with a respective entry in the MST in response to the LPE providing message-matching results for a message associated with the respective entry;
      determine qualified request queues of a plurality of request queues based on the bit associated with the respective MST entry; and
      arbitrate among respective head requests of the qualified request queues for providing access to the MST.

2. The network interface controller of claim 1, wherein the message is associated with a direct memory access (DMA) or a remote direct memory access (RDMA) operation.

3. The network interface controller of claim 2, wherein the message comprises a multi-packet PUT message, a GET message, or a single-packet atomic memory operations (AMO) message.

4. The network interface controller of claim 3, wherein the message comprises a multi-packet PUT message, wherein the first packet is the initial packet of the multi-packet PUT message, wherein the second packet is a continuation packet in the message, and wherein the second packet is delivered out of order.

5. The network interface controller of claim 4, wherein the message comprises a single-packet message, and wherein the second packet belongs to a retry message of the single-packet message.

6. The network interface controller of claim 1, wherein a request to read the message-matching results associated with the entry is processed subsequent to the bit associated with the entry being set.

7. The network interface controller of claim 1, wherein the MST logic block is further to:
   generate a completion event in response to the network interface controller receiving a response to a last packet associated with the message; and
   deallocate an entry from the MST corresponding to the message.

8. The network interface controller of claim 1, wherein a respective entry in the MST is associated with an index, and wherein the index is available for reuse subsequent to the corresponding entry being deallocated from the MST.

9. A method, comprising:
   storing, in a storage device of a network interface controller (NIC), a message state table (MST);
   performing, by a hardware list-processing engine (LPE) of the NIC, message matching on a first packet of a message received via a network interface coupling the NIC to a network;
   storing results of the message matching in the MST;
   receiving a request to read the results of the message matching from the MST in response to the NIC receiving a second packet associated with the message;
   setting a bit associated with a respective entry in the MST in response to the LPE providing message-matching results for a message associated with the respective entry;
   determining qualified request queues of a plurality of request queues based on the bit associated with the respective MST entry; and
   arbitrating among respective head requests of the qualified request queues for providing access to the MST.

10. The method of claim 9, wherein the message is associated with a direct memory access (DMA) or a remote direct memory access (RDMA) operation.

11. The method of claim 10, wherein the message comprises a multi-packet PUT message, a GET message, or a single-packet atomic memory operations (AMO) message.

12. The method of claim 11, wherein the message comprises a multi-packet PUT message, wherein the first packet is the initial packet of the multi-packet PUT message, wherein the second packet is a continuation packet in the message, and wherein the second packet is delivered out of order.

13. The method of claim 12, wherein the message comprises a single-packet message, and wherein the second packet belongs to a retry message of the single-packet message.

14. The method of claim 9, wherein a request to read the message-matching results associated with the entry is processed subsequent to the bit associated with the entry being set.

15. The method of claim 9, further comprising:
    generating a completion event in response to the network interface controller receiving a response to a last packet associated with the message; and
    deallocating an entry from the MST corresponding to the message.

16. The method of claim 9, wherein a respective entry in the MST is associated with an index, and wherein the index is available for reuse subsequent to the corresponding entry being deallocated from the MST.

17. The network interface controller of claim 1,
    wherein determining the qualified request queues is further based on determining that a credit is available for returning the message-matching results, and
    wherein a respective type of message uses a corresponding respective credit pool.

18. The network interface controller of claim 8, wherein the MST logic block is further to:
    select a queue into which to enqueue the request based on the index and a traffic class number of the request.

19. The method of claim 9, further comprising:
    determining the qualified request queues further based on determining that a credit is available for returning the message-matching results,
    wherein a respective type of message uses a corresponding respective credit pool.

20. The method of claim 16, further comprising:
    selecting a queue into which to enqueue the request based on the index and a traffic class number of the request.

* * * * *